United States Patent [19]

Jolissaint

[11] Patent Number: 4,987,587
[45] Date of Patent: Jan. 22, 1991

[54] METHOD AND APPARATUS FOR PROVIDING 800 NUMBER SERVICE

[75] Inventor: Charles H. Jolissaint, Sunnyvale, Calif.

[73] Assignee: International Business Machines Corporation, Armonk, N.Y.

[21] Appl. No.: 385,899

[22] Filed: Jul. 26, 1989

[51] Int. Cl.$^5$ .............................................. H04M 3/42
[52] U.S. Cl. ........................................ 379/94; 379/113
[58] Field of Search ................. 379/94, 214, 113, 142, 379/97, 207

[56] References Cited

U.S. PATENT DOCUMENTS

| | | | |
|---|---|---|---|
| 4,555,594 | 11/1985 | Friedes et al. | |
| 4,600,814 | 7/1986 | Cunniff et al. | |
| 4,757,267 | 7/1988 | Riskin | 379/113 |
| 4,757,529 | 7/1988 | Glapa et al. | 379/214 |
| 4,763,191 | 8/1988 | Gordon et al. | 379/94 |
| 4,774,721 | 9/1988 | Gift et al. | |
| 4,788,715 | 11/1988 | Lee | 379/214 |
| 4,792,968 | 12/1988 | Katz | |
| 4,797,911 | 1/1989 | Szlam et al. | |
| 4,797,913 | 1/1989 | Kaplan et al. | 379/94 |
| 4,805,209 | 2/1989 | Baker, Jr. et al. | |
| 4,807,023 | 2/1989 | Bestler et al. | |
| 4,853,955 | 8/1989 | Thorn et al. | 379/142 |

OTHER PUBLICATIONS

"Directory Assistance Message Accounting System", IBM Technical Disclosure Bulletin, vol. 18, No. 6, Nov. 1975, pp. 1687-1690 by R. L. Brady et al.
"Telephone Identifier Interface", IBM Technical Disclosure Bulletin, vol. 19, No. 4, Oct. 1976, pp. 1569-1570 by Brady et al.
"Electronic Automatic Number Identification Circuits", IBM Technical Disclosure Bulletin, vol. 19, No. 8, Jan. 1977, pp. 2888-2890 by R. L. Brady.

*Primary Examiner*—Jin F. Ng
*Assistant Examiner*—Stella L. Woo
*Attorney, Agent, or Firm*—Perman & Green

[57] ABSTRACT

Apparatus and method for providing an on-site 800 number customer-made determination of a further action to be taken in response to a caller dialing an 800 number associated with the 800 number customer. A system 10 includes apparatus for receiving from an 800 number network provider Host processor 26 information expressive of an occurrence of a caller having dialed an 800 telephone number. The system 10 further includes apparatus for determining at a customer's Host processor 12 an action to be taken in response to the caller having dialed the 800 telephone number. The system also includes apparatus for transmitting from the customer's Host processor to the network provider's Host processor 26 information expressive of the determined action to be taken in response to the caller having dialed the 800 telephone number. The information received by the customer's Host processor includes an identification of the caller as provided by the caller's billing telephone number. The determined action may be to deny or to accept the call. If the call is accepted the customer's Host 12 determines a destination phone number that is provided to the network provider's Host processor for further transmission to the caller's local Host processor.

22 Claims, 2 Drawing Sheets

METHOD AND APPARATUS FOR PROVIDING 800 NUMBER SERVICE

FIELD OF THE INVENTION

This invention relates generally to telephony method and apparatus and, in particular, relates to method and apparatus for providing an enhanced 800 number service locally with an 800 number customer's on-premise host computer.

BACKGROUND OF THE INVENTION

Traditional 800 number phone service is supplied by a network provider to allow billing to be assumed by the called party. Typically, upon detecting an 800 number the network provider host computer communicates with an 800 server host via a Signalling System 7 (SS7) link that is external to and separate from normal voice links. The 800 server host maintains a data base of destination phone numbers that correspond to 800 numbers in order to look-up the corresponding destination phone number from the 800 number. In addition, the 800 server host data base includes information relating to destination phone numbers also as a function of time of day, geographical region of the originating call, etc. For example, an 800 number call placed between nine and five from Oregon to a catalog ordering number may be routed to a catalog ordering office in California. Another call to the same 800 number and at the same time but made from Delaware may be routed to a catalog ordering office in New Jersey. However, the same 800 number call placed at, for example, ten P.M. local time from either Oregon or Delaware may be routed to a catalog ordering office in Chicago, the Chicago office being the only office that is staffed 24 hours a day.

While providing the 800 number customer with a significant degree of flexibility and convenience the conventional 800 number call processing approach described above also presents several limitations. One such limitation is that the conventional 800 number call processing approach does not provide for a dynamic allocation of a destination phone number or phone numbers. For example, due to call overloading at one office or at one agent within an office it may be desirable to temporarily route further incoming 800 number calls to a different destination phone number. Another limitation is that the conventional 800 number call processing approach does not provide a capability to allocate a destination phone number based upon a caller's identity, as determined via Automatic Number Identification (ANI) from the caller's telephone number at the destination site.

It is therefore an object of the invention to provide a method and apparatus for enhancing 800 number call processing at an 800 number customer's site.

It is another object of the invention to provide a method and apparatus for performing a dynamic allocation of destination phone numbers corresponding to an 800 number, the allocation being based upon such criteria as call loading or upon the identity of a caller as determined from the caller's telephone number and the 800 number called for service.

It is another object of the invention to provide a method and apparatus for denying at an 800 customer's site a pending 800 number call, the pending 800 number call being denied based upon criteria such as call loading or the identity of a caller as determined from the caller's telephone number.

SUMMARY OF THE INVENTION

The foregoing limitations are overcome and the objects of thee invention are realized, by apparatus and method for processing an 800 number telephone call at an 800 number customer's phone system. The customer's phone system is of a type that includes a plurality of phones associated with 800 number destination phone numbers. The plurality of phones are managed by a digital switch, such as a CBX. The system further includes a customer's Host processor coupled to the digital switch. The customer's Host processor includes memory for storing data structures and application programs, including a data base of caller's billing numbers and possibly other data for identifying 800 number callers. The system further includes an interface bidirectionally coupling the Host processor to an 800 number network provider Host processor. In accordance with the invention the system further includes apparatus for receiving from the 800 number network provider Host processor information expressive of the occurrence of a caller having dialed an 800 telephone number. The system further includes apparatus for determining at the customer's Host processor an action to be taken in response to the caller having dialed the 800 telephone number. The system also includes apparatus for transmitting from the customer's Host processor to the network provider's Host processor information expressive of the determined action to be taken in response to the caller having dialed the 800 telephone number. The information received by the customer's Host processor includes an identification of the caller as provided by the caller's billing telephone number. The determined action may be to deny or to accept the call. If the call is accepted the system determines a destination phone number that is provided to the network provider's Host processor for transmission to the caller's local Host processor.

As such, the invention provides for an on-site 800 number customer-made determination of a further action to be taken in response to a caller dialing an 800 number associated with the 800 number customer. This further action may include denying an acceptance of the call based upon the caller's identity or upon call load factors. The further action may instead include the determination of a destination phone number based on such factors as load balancing considerations or upon the caller's identity.

BRIEF DESCRIPTION OF THE DRAWING

The above set forth and other features of the invention will be made more apparent in the ensuing Detailed Description of the Invention when read in conjunction with the attached Drawing, wherein:

FIG. 3 illustrates a format of a data packet that is transmitted from an 800 number Network Provider's Host to the customer's Host;

FIG. 4; illustrates a format of a data packet that is transmitted from the customer's Host to the Network Provider's Host; and FIG. 5 illustrates a format of a data packet that is transmitted from the 800 number Network Provider's Host to the customer's Host in response to the transmission of the packet illustrated in FIG. 4.

DETAILED DESCRIPTION OF A PREFERRED EMBODIMENT OF THE INVENTION

The ensuing description of the invention is made in the context of a system employing well-known "800" type phone numbers. It should be realized however that the invention can be practiced with telephone numbers having other than this specific prefix. That is, the invention can be practiced with other telephone numbers that allow a called party to assume the billing for the call. As such, references to 800-type telephone numbers made below are to be construed broadly to encompass other than this specific prefix.

Figure 1:
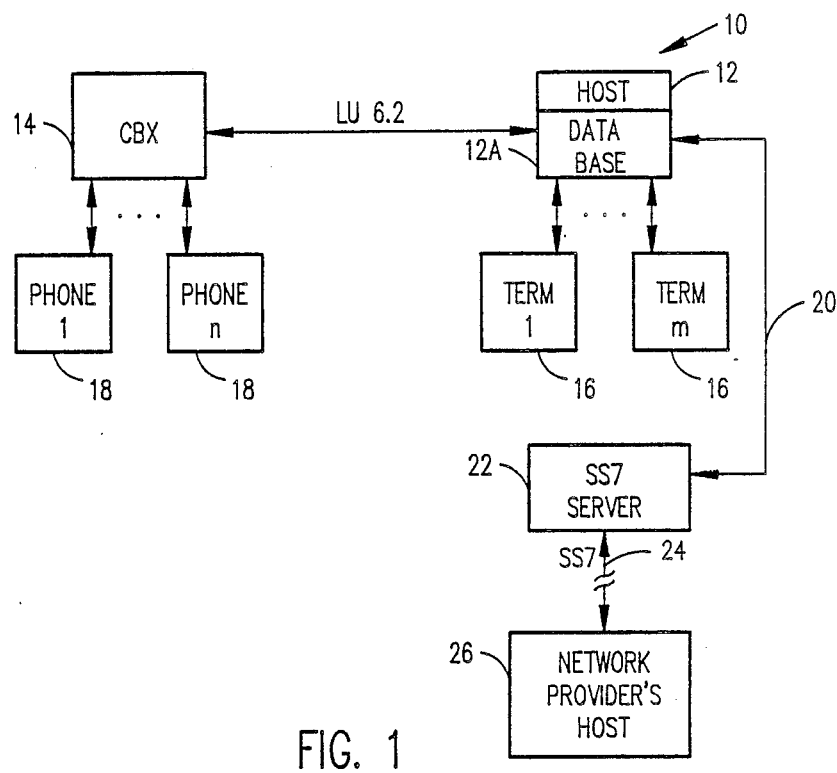
FIG. 1 is a block diagram illustrating major functional blocks of a telephony system embodying the invention.

FIG. 1 illustrates in block diagram form a telephony system, in particular a Call Management Control System (CMCS) 10 that embodies the teachings of the invention. System 10 in a presently preferred embodiment of the invention includes an 800 number customer's host processor (Host) 12 coupled via a Logical Unit (LU) 6.2 interface to a digital switch, such as a Computerized Branch Exchange (CBX) 14. Particularly suitable apparatus that embodies these functional blocks is described in detail in commonly assigned U.S. Pat. No. 4,805,209, issued Feb. 14, 1989. The disclosure of U.S. Pat. No. 4,805,209 is incorporated by reference herein in its entirety. Although the ensuing description is made in reference to a hardware and; software system as described in U.S. Pat. No. 4,805,209 it should be realized that the teaching of the invention is not limited for use with only such a system and that, instead, the teaching of the invention is applicable to a large number of possible hardware and/or software embodiments. An 800 number customer as used herein is intended to encompass individuals or other entities that assume responsibility for payment for telephone calls made to a specific 800 telephone number.

The Host 12 may be a type of IBM System/370 processor, a description of which is found in a document entitled "S/370 Reference Summary, GX20-1850", published by the International Business Machines Corporation. While the Host 12 in a presently preferred embodiment of the invention is embodied in a S/370 processor it should be realized that the invention can be practiced with other mainframes, minicomputers and microprocessors.

The CBX 14 may be a CBX known in the art as a ROLM CBX II 9000, a description of which is found in a document entitled "ROLM CBX II 9000 Business Communications System", published by the ROLM Corporation (1986). It should be realized however that the invention can be practiced with other varieties of CBX equipment.

The LU 6.2 communication link between the Host 12 and the CBX 14 is a standard System Data Link Control (SDLC) communication link that corresponds to the LU 6.2 standard. A detailed description of a LU 6.2 communication link and a description of how to implement a program interface to conform with this standard is provided in the following documents published by the International Business Machines Corporation: "Systems Network Architecture: Sessions Between Logical Units, GC20-1868" and "SNA Transaction Programmer's Reference Manual For LU 6.2, GC30-3084". In other embodiments of the invention the link between the Host 12 and the CBX 14 may be other than a communication link that conforms to the LU 6.2 standard.

As described in U.S. Pat. No. 4,805,209 there are coupled to Host 12 a plurality of user interface terminals, shown herein as terminals 16 (TERM 1 through TERM m). Coupled to CBX 14 are a plurality of phones, shown herein as phones 18 (PHONE 1 through PHONE n). Also coupled to CBX 14 is a phone trunk (not shown) containing voice-carrying signal lines. At least some of the phones 18 are associated with 800 number destination telephone numbers. That is, at least some of the phones 18 are associated with telephone numbers into which a particular 800 number is translated.

In accordance with the invention system 10 is further provided with an interface communication link 24 to an 800 number Network Provider's Host computer 26. In a presently preferred embodiment of the invention the link 24 is a Signalling System No. 7 (SS7) communication link that is coupled to the Host 12 via a SS7 Server 22. In a presently preferred embodiment of the invention the SS7 Server 22 is a stand alone computer such as an IBM PS/2 computer. A communication link 20 such as a RS-232C communication link bidirectionally couples the SS7 Server 22 to the Host 12. SS7 Server 22 includes circuitry and software to interface with the SS7 communication link 24 to transmit information to and receive information from the 800 number Network Provider's Host computer 26. Signalling System No. 7 was defined by C.C.I.T.T. Study Group XI during the study period 1976–80 resulting in a specification of the No. 7 common channel signaling being approved by the C.C.I.T.T.'s plenary assembly in November 1980. The characteristics of the Signalling System No. 7 are set forth in C.C.I.T.T. Document AP VII No. 18-E: Specification of the C.C.I.T.T. Common Channel Signalling System No. 7: July, 1980. The invention is however not to be construed to be limited for use only with a SS7-type communication link.

Network Provider's Host 26 is typically located at some distance from the SS7 Server 22 while the Host 12, CBX 14 and SS7 Server 22 are typically located in substantial proximity one to another on-site at an 800 number customer's premises. From the link 24 the SS7 Server 22 receives information relating to pending 800 number calls and to the link 24 is transmitted information related to such calls, as will be described in detail below. It should be realized that in other embodiments of the invention that the functionality of the SS7 Server 22 may be included within the Host 12. Further in accordance with the invention the Host 12 is coupled to a data base 12A, the data base 12A containing information for relating caller's billing numbers, that is a caller's identification or ID, with destination phone numbers. This aspect of the invention is described in detail below. The data base 12A is typically maintained within the memory of the Host 12 along with other data structures and application programs, including a program or programs operable for realizing the method of the invention.

Figure 2:
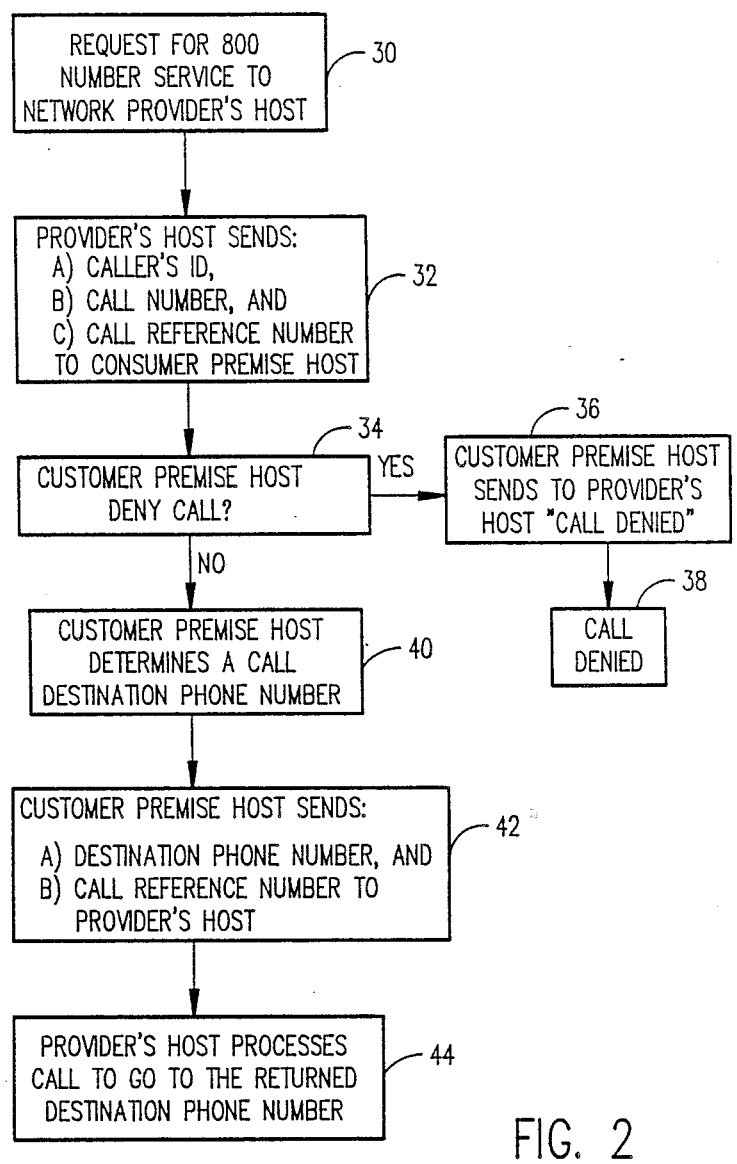
FIG. 2 is flow chart illustrating steps of a method of the invention.

Referring now to FIG. 2 there is shown in flowchart form the interaction between the customer's Host 12, SS7 Server 22 and the 800 number Network Provider's Host 26. A caller dials an 800 number and the request for 800 number service is transmitted in a conventional manner via a SS7 communication link from the caller's local switching element (not shown) to the 800 number Network Provider's Host 26 (block 30). In a conventional 800 number processing system the Network Provider's Host 26 determines, from a data base, a destination number corresponding to the 800 number and returns the destination number via the SS7 communication link to the caller's local switching element for further call processing.

In accordance with the invention at block 32 the Network Provider's Host 26 instead sends via the SS7 link 24 and the SS7 Server 22 to the Host 12 a communications packet 32A. The packet 32A indicates that a caller has dialed an 800 telephone number associated with the customer. As shown in FIG. 3 the communications packet 32A includes data fields expressive of at least the caller's identification, that is the caller's billing phone number, the 800 number dialed and a call reference number. The SS7 Server 22 receives the data packet 32A and transmits same via communication link 20 to Host 12.

At block 34 the customer's Host 12 accesses the data base 12A and makes a determination as to whether to deny or to accept the 800 number call. As will be described later this determination may be based on a number of criteria such as whether the caller should be denied for a security reason or for some other reason. The customer's Host 12 maintains within the data base 12A caller phone numbers such that the caller's phone number, previously received from the Network Provider's Host 26 within data packet 32A, can be compared against the database of stored telephone numbers. If a decision is made to deny the call at block 36 the Host 12 sends to the Network Provider's Host 26 via the SS7 Server 22 a message, the format of which is described in detail below, that the call is denied. Thereafter, at block 38, the call is denied by the 800 number Provider's Host 26 to the caller's local switching element (not shown). This denial is consistent with current denial practices such as a recording spoken to the caller indicating that this 800 number is not accessible by the caller or such as by an error tone.

Returning to block 34 if a decision is made to accept the incoming 800 number call the method transfers to block 40. At block 40 the Host 12 makes a determination of a destination phone number, that is, the identity of one of the phones 18 for answering the impending 800 number call. This determination is made based in part on the previously provided caller's ID in conjunction with data base 12A. A number of criteria may be employed at this step in order to influence the determination of the destination phone number. As will be described in detail below these criteria may relate to system call loading, a contractual agreement with the caller as to a particular grade of service, etc.

At block 42 the customer's Host 12 returns to the 800 network Provider's Host 26,, via the SS7 Server 22 a data packet 42A having data fields expressive at least of the determined destination phone number, the call reference number previously provided and a call status indicator. The format of this returned data packet 42A is shown in FIG. 4. As can be seen, the call reference number enables the Network Provider's Host 26 to associate the received destination phone number with a previously sent 800 number. The call status field contains a response code whereby the Host 12 indicates, by example, that the packet 42A is to receive normal processing by the Host 26 or that the 800 number call is denied. Normal processing being indicated causes the Host 26 to return the Host 12 determined destination phone number to the caller's local switching element (not shown). Call denial being indicated may cause, for example, the Host 26 to provide a busy tone or cause a recorded message to be played for the caller. The content of the destination phone number field may be ignored by the Host 26 when the call status field indicates that the call is denied.

At block 44 the Network Provider's Host 26 processes the 800 number call to direct the call to the returned destination phone number. That is, the destination phone number is returned in a conventional manner to the caller's local switching element (not shown). Also at block 44 the Host 26 preferably returns an acknowledgement data packet to the Host 12, such as the packet 44A shown in FIG. 5. Acknowledgement data packet 44A includes a data field for the call reference number and a data field for indicating the disposition of the 800 number call. For example, the call disposition indicates that the Host 12 determined call destination number was successfully returned to the caller's local switching element. This data field may also indicate that a predetermined time-out expired, due to non-response by the Host 12, and that the Host 26 instead processed the 800 number call request by conventional methods to return a default destination number to the caller. In accordance with this latter indication the Host 26 may also provide an additional data field for informing the Host 12 of the identity of the default destination number provided for the caller.

As can be realized, the Network Provider's Host 26 is modified to communicate in the manner described above with the Host 12 via the SS7 communication link 24. This additional functionality of the Network Provider's Host 26 is readily provided by computer software change. Furthermore, the Network Provider's Host 26 is preferably modified such that it has knowledge of which 800 number customers have the system 10 of the invention installed. For those 800 number customers not having the system 10 of the invention the Network Provider's Host 26 operates in a conventional manner to determine destination telephone phone numbers. The modification may be readily achieved by modifying the Network Provider's Host 26 data base to indicate which 800 number customers have the system 10 of the invention installed. Preferably the Network Provider's Host 26 operates such that if the response at block 42 is not received from the customer's Host 12 within some predetermined time-out interval the Network Provider's Host 26 defaults to the conventional method of determining the 800 number from the Network Provider's Host 26 own data base of default destination phone numbers. This time-out period may be typically six to eight seconds. This latter functionality provides for a backup capability for those instances when the Host 12 is off-line.

Further in accordance with the invention the step 40 described above, wherein the Host 12 determines a call destination phone number, may be accomplished by a number of different techniques employing various criteria.

By example, the determination may involve a load balancing consideration wherein the determination of which call destination among multiple possible call destinations is made based on which destination is currently least congested. One suitable method for making such a determination is disclosed in commonly assigned copending U.S. patent application Ser. No. 07/294,316, filed Jan. 6, 1989.

As another example the determination may involve a customer site where a specific 800 number call center may have multiple destination phone numbers that are all serviced by the same agent group. However, the choice of one particular call destination number over another may result in a different queuing priority with a resulting different time to service. In this case the destination number chosen may be related to the business importance of the caller, such as the volume of business conducted by the caller, or to a contractual agreement for a certain grade of service with the caller. The caller is identified by the Host 12 from the caller's ID as received from the Network Provider's Host 26 at step 32 of FIG. 2. Information related to caller priorities are typically stored within the data base 12A associated with the caller's telephone number(s).

As another example the destination number may be a reserved number given temporarily to that particular caller so that the caller enters a destination switch and is processed to that reserved number, as disclosed in co-pending U.S. patent application Ser. No. 07/294,316. When the caller comes into the destination switch the teaching of copending U.S. patent application Ser. No. 07/294,316 provides for an event to be sent to the Host 12 from the destination switch notifying the Host 12 that a call to the destination number reserved for the caller has been completed. This procedure advantageously provides for the Host 12 to associate other caller account information about the caller and to initially display this information on a TERM k associated with a specific agent's PHONE k. The identity of the PHONE k is determined from the caller's billing number identification. As such, this information is subsequently employed in conjunction with the intelligent answering capability that is a feature described in U.S. Pat. No. 4,805,209.

In accordance with a still further example of the capability provided by the method and apparatus of the invention 800 number service may be denied a caller at steps 34 and 36 above based upon criteria such as a caller's identification not being allowed due to a security consideration. Another criteria may relate to a call center overload determination, such as in a disaster recovery situation, in order to limit a number of incoming calls to a center during times of overload.

As a still further example a caller's billing number is related by the Host 12 through data base 12A to a caller's business profile and a destination phone number associated with a particular service group assigned to the business profile is selected. This selected destination phone number is returned to the SS7 Network Provider's Host 26 at step 42 of the method shown in FIG. 2. As an example, all insurance customers of an 800 number customer may dial a single 800 number. However, callers identified by Host 12 as senior care policyholders may be directed to a different service group than callers identified as Workman's Compensation callers.

Of course, the foregoing list of examples is not intended to be exhaustive but is provided to illustrate but a few of the significant advantages made possible by the teaching of the invention.

It should be realized that the teaching of the invention is not to be construed to be limited to only the specific embodiment disclosed above. By example, the information conveyed by data packets 32A, 42A and 44A may be provided in a number of different formats other than that specifically shown. Also, it should be realized that although the invention has been described in the context of a system employing 800-type phone numbers that the invention can be practiced with telephone numbers having other than this specific three digit prefix. That is, the teaching of the invention can be employed with other calling methods and prefixes that allow the called party to assume billing for the call. Therefore, while the invention has been particularly shown and described with respect to a presently preferred embodiment thereof, it will be understood by those skilled in the art that changes in form and details may be made therein without departing from the scope and spirit of the invention.

I claim:

1. A method of processing an 800 number telephone call in an 800 number customer's system, the customer's system having a plurality of phones associated with 800 number destination phone numbers, the plurality of phones, being managed by a digital switch, the customer's system further including a customer's Host processor coupling to the digital switch, the customer's system further including, means for bidirectionally coupling the customer's Host processor to an 800 number network provider Host processor, the method comprising the steps of, in response to a caller dialing an 800 telephone number:
    (a) transmitting from the 800 number, network provider Host processor to the customer's Host processor information expressive of the occurrence of the caller having dialed the number, 800 number;
    (b) determining at the customer's Host processor an action to be taken in response to the caller having dialed the 800 number;
    (c) transmitting from, the customer's Host processor to the network provider's Host processor information expressive of the determined action to be taken in response to the caller having dialed the 800 number; and,
if the customer's Host processor does not transmit the information expressive of the determined action within a predetermined interval of time the method includes a step of transmitting from the network provider's Host processor to the customer's Host processor default information including an indication that the network provider's Host processor has provided a default destination telephone number associated with the 800 number.

2. A method as set forth in claim wherein the first step of transmitting includes a step of sending a first data packet from the network provider's Host processor to the customer's Host processor, the first data packet being comprised of data fields expressive of a least:
    (a) an identification of the caller;
    (b) the 800 number dialed by the caller; and
    (c) a reference number.

3. A method as set forth in claim 2 wherein the data packet is sent over a Signalling System 7 communications link.

4. A method as set forth in claim 3 wherein the step of sending includes a step of receiving the data packet with the interface means, the interface means being interposed between the host processor and the Signalling System 7 communications link.

5. A method as set forth in claim 2 wherein the caller's identification is sent by sending the caller's billing telephone number.

6. A method as set forth in claim wherein the first step of transmitting includes a step of sending an identification of the caller and wherein the step of determining includes a step of accessing a data base associated with the customer's Host processor, the data base being accessed in accordance with the caller's identification.

7. A method as set forth in claim 1 wherein the step of determining includes a step of determining whether to accept or deny the call based at least in part upon call load balancing considerations.

8. A method as set forth in claim 1 wherein the first step of transmitting includes a step of sending an identification of the caller,. and wherein the step of determining includes a step of determining whether to accept or deny the call based at least in part upon the caller's identification.

9. A method as set forth in claim 1 wherein the step of determining includes a step of determining a destination phone number to which to connect the caller.

10. A method as set forth in claim 1 wherein the first step of transmitting includes a step of sending an identification of the caller and wherein the step of determining includes a step of determining a destination phone number to which to connect the caller based at least in part upon the caller's identification.

11. A method as set forth in claim 9 wherein the second step of transmitting includes a step of sending a second data packet from the customer's Host processor to the network provider's Host processor, the second data packet being comprised of data fields expressive of at least:

(a) the destination phone number; and
(b) the reference number.

12. Apparatus for processing an 800 number telephone call at an 800 number customer's phone system, the customer's phone system having a plurality of phones associated with 800 number destination phone numbers, the plurality of phones being managed by a digital switch means, the system further including a customer's Host processor coupled to the digital switch, the system further including an interface means for bidirectionally coupling the Host processor to an 800 number network provider Host processor, the apparatus comprising:

means for receiving from the 800 number network provider Host processor information expressive of the occurrence of a caller having dialed an 800 telephone number;

means for determining at the customer's Host processor an action to be taken in response to the caller having dialed the 800 telephone number;

means for transmitting from the customer's Host processor to the network provider's Host processor information expressive of the determined action to be taken in response to the caller having dialed the 800 telephone number; and means, responsive to the customer's Host processor not transmitting the information expressive of the determined action within a predetermined interval of time, for transmitting from the network provider's Host processor to the customer's Host processor default information including an indication that the network provider's Host processor has provided a default destination telephone number associated with the 800 number.

13. Apparatus, as set forth in claim 12 wherein the network provider's Host processor includes means for performing the determined action in response to the network provider's Host processor receiving the information expressive of the determined action.

14. Apparatus as set forth in claim 12 wherein the received information comprises a first data packet having data fields expressive of a least:

(a) an identification of the caller;
(b) the 800 number dialed by the caller; and
(c) a reference number.

15. Apparatus as set forth in claim 14 wherein said receiving and said transmitting means comprise means for interfacing to a Signalling System 7 communications link and wherein the data packet is transmitted over the Signalling System 7 communications link.

16. Apparatus as set forth in claim 12 wherein the received information includes an identification of the caller, the apparatus further comprising data base means associated with the customer's Host processor, the data base means being accessed in accordance with the caller's identification.

17. Apparatus as set forth claim 14 wherein the means for determining includes means for determining at least a destination phone number for the 800 number call and wherein the transmitting means includes means for transmitting a second data packet from the customer's Host processor to the network provider's Host processor, the second data packet being comprised of data fields expressive of at least:

(a) the destination phone number; and
(b) the reference number.

18. Apparatus as set forth claim 17 wherein the means for determining includes means for determining at least whether to deny the dialed 800 number call or whether to determine a destination phone number for the 800 number call, and wherein the second data packet further includes a data field expressive of the 800 number call being denied by the determining means.

19. Apparatus as set forth in claim 15 wherein said interfacing means comprises processor means having Signalling System 7 interface means, the processor means further having means for bidirectionally coupling the processor means to the customer's Host processor for transmitting information thereto and for receiving information therefrom.

20. A method of processing a telephone call of the type in which a called party assumes responsibility for payment of a call made to a specific telephone number, the called party having a phone system having a plurality of phones associated with destination phone numbers, the plurality of phones being managed by a digital switch, the system further including an interface means for bidirectionally coupling the called party's system to a network provider's system, the method comprising the steps of, in response to a caller dialing the specific telephone number:

(a) sending from the network provider s system to the called party's system first information units expressive of the occurrence of the caller having dialed the specific number, the first information units including
an identification of the caller; and
the specific telephone number dialed by the caller;

(b) determining with the called party's system an action to be taken in response to the caller having dialed the specific telephone number; and (c) returning from the called party's system to the network provider's system second information units expressive of the determined action to be taken in response to the caller having dialed the specific telephone number, the second information units including a destination phone number; and, (d) sending from the network provider s system to the called party's system third information units, the third information units including
an action taken by the network provider's system, wherein
the action taken information indicates that the called party's system has not returned the second information units within a predetermined interval of time and wherein the third information units include a default destination telephone number supplied for the caller by the network provider's system.

21. A method as set forth in claim 20 wherein the second information units further include a call status indication for indicating that the called party's system has determined to deny the call or has determined to accept the call.

22. A method as set forth in claim 20 wherein the first information units, the second information units and the third information units all include a call reference identifier.

* * * * *

UNITED STATES PATENT AND TRADEMARK OFFICE
CERTIFICATE OF CORRECTION

PATENT NO. : 4,987,587                  Page 1 of 2

DATED : January 22, 1991

INVENTOR(S) : Charles H. Jolissaint

It is certified that error appears in the above-identified patent and that said Letters Patent is hereby corrected as shown below:

Claim 1, col. 8, line 18 after "phones" delete the comma ",".

Claim 1, col. 8, line 20 delete "coupling" and insert --coupled--.

Claim 1, col. 8, line 21 after "including" delete the comma ",".

Claim 1, col. 8, line 26 after "number" delete the comma ",".

Claim 1, col. 8 line 29, delete the first occurrence of "number".

UNITED STATES PATENT AND TRADEMARK OFFICE
CERTIFICATE OF CORRECTION

PATENT NO. : 4,987,587

DATED : January 22, 1991

INVENTOR(S) : Charles H. Jolissaint

It is certified that error appears in the above-identified patent and that said Letters Patent is hereby corrected as shown below:

Claim 1, col. 8, line 33, after "from" delete the comma ",".

Claim 1, col. 8, line 37 after "and" delete the comma ",".

Claim 2, col. 8, line 46 after "claim" insert --1--.

Claim 6, col. 8, line 65 after "claim" insert --1--.

Claim 8, col. 9, line 9 delete ",.".

Signed and Sealed this

Twenty-sixth Day of May, 1992

Attest:

DOUGLAS B. COMER

*Attesting Officer*    Acting Commissioner of Patents and Trademarks